(12) United States Patent
Yamazaki

(10) Patent No.: US 8,094,542 B2
(45) Date of Patent: Jan. 10, 2012

(54) OPTICAL PICKUP DEVICE, OPTICAL DISC DEVICE, AND DIFFRACTION GRATING

(75) Inventor: Kazuyoshi Yamazaki, Yamato (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 211 days.

(21) Appl. No.: 12/417,014

(22) Filed: Apr. 2, 2009

(65) Prior Publication Data

US 2010/0020670 A1    Jan. 28, 2010

(30) Foreign Application Priority Data

Jul. 28, 2008    (JP) ................. 2008-193012

(51) Int. Cl.
*G11B 7/135*    (2006.01)
(52) U.S. Cl. .................................. 369/112.11
(58) Field of Classification Search .......... None
See application file for complete search history.

(56) References Cited

U.S. PATENT DOCUMENTS

| | | | |
|---|---|---|---|
| 6,278,548 B1 * | 8/2001 | Shimano et al. | 359/565 |
| 2001/0026399 A1 * | 10/2001 | Nakabayashi et al. | 359/576 |
| 2010/0020670 A1 * | 1/2010 | Yamazaki | 369/109.01 |

FOREIGN PATENT DOCUMENTS

| | | |
|---|---|---|
| JP | 09-081942 | 3/1997 |
| JP | 2002-350625 | 12/2002 |
| JP | 2006-228304 | 8/2006 |

OTHER PUBLICATIONS

English machine translation of Shindo, JP 2006-228304, published Aug. 31, 2006.*
Sano et al., "Novel One-beam Tracking Detection for Dual-Layer Blu-ray Discs", CPM2005-149, Institute of Electronics, Information and Communication Engineers (IEICE), pp. 31-34, 2005.

* cited by examiner

*Primary Examiner* — Peter Vincent Agustin
(74) *Attorney, Agent, or Firm* — Antonelli, Terry, Stout & Kraus, LLP.

(57) ABSTRACT

An optical pickup device and an optical recording/reproduction device are provided that can suppress a tracking error signal offset generated in the boundary between an unrecorded area and a recorded area. A three-beam diffraction grating is divided into two areas. A division line that divides the diffraction grating into two areas has a step in the direction almost vertical to a groove period structure, and the part of the division line in the step has a staircase shape. The phase difference in the groove period structures between one area and the other area, separated by the division line, is about 180 degrees.

3 Claims, 22 Drawing Sheets

FIG.3
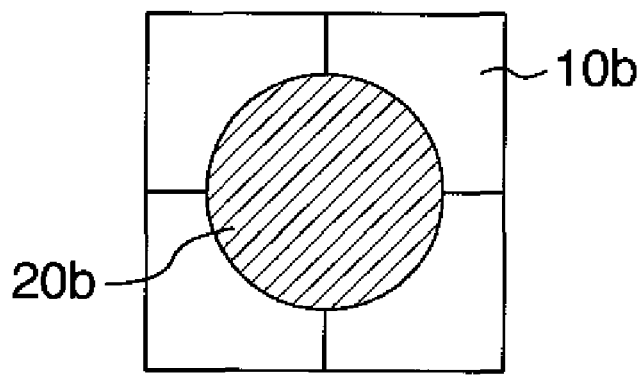
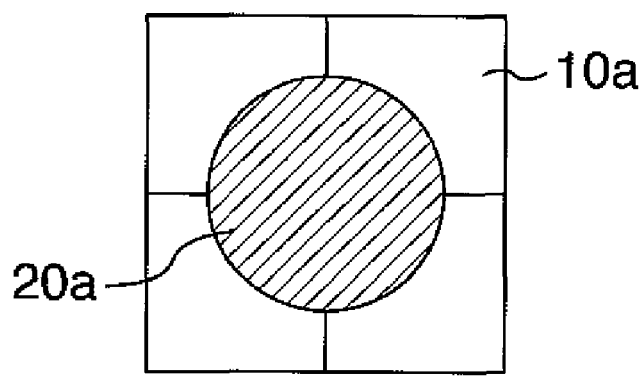
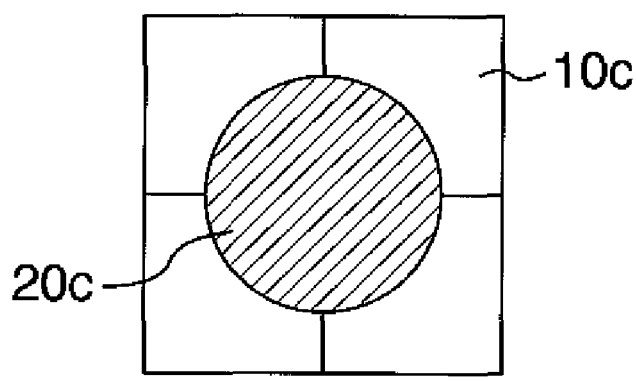
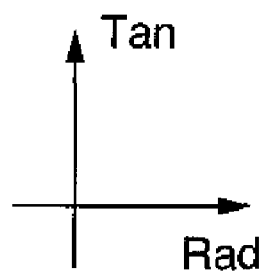

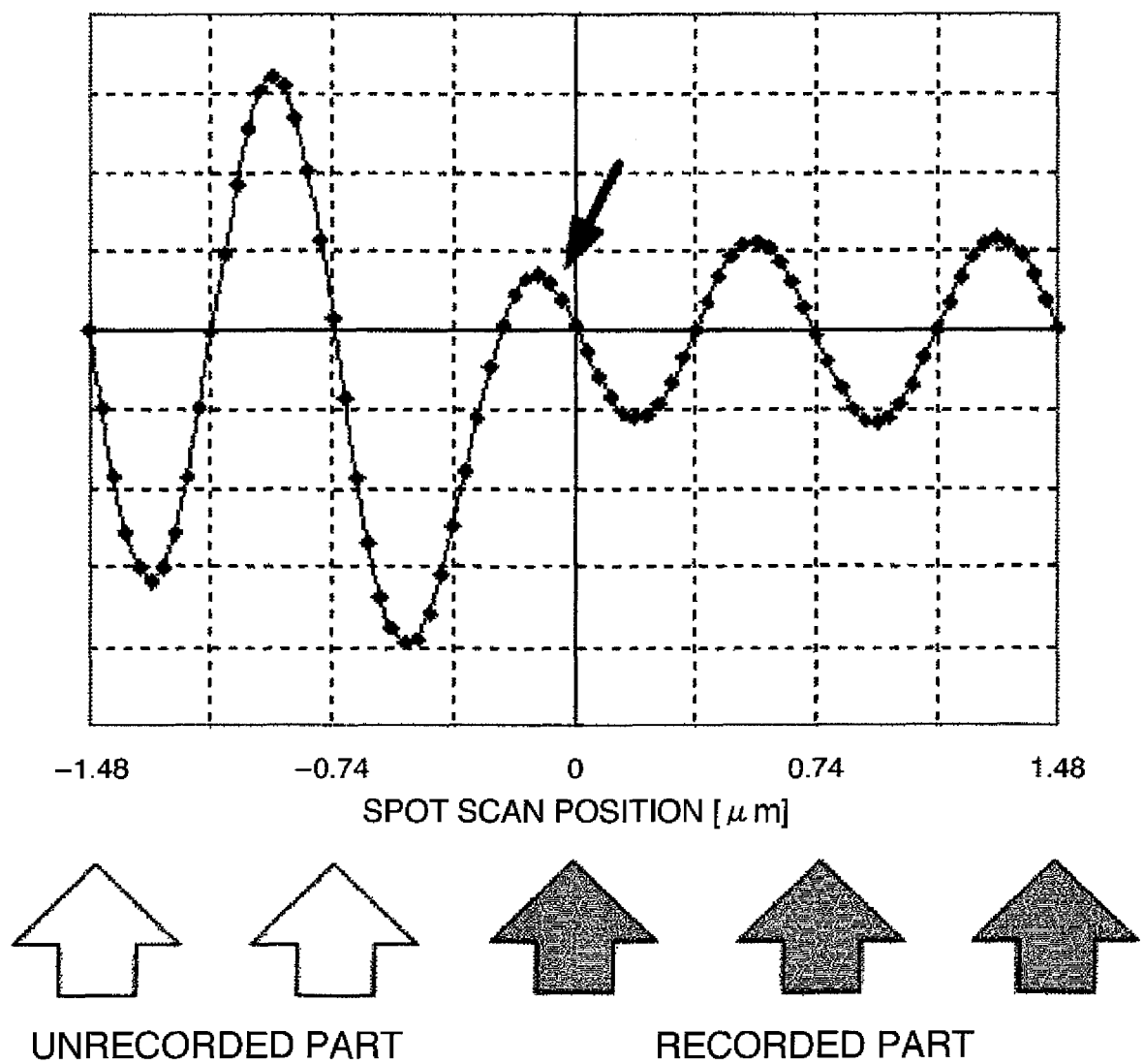

CONVENTIONAL DPP METHOD

CONVENTIONAL INLINE DPP METHOD

MPP, k × SPP SIGNAL AMPLITUDE (CD-R)

DPP SIGNAL AMPLITUDE (CD-R)

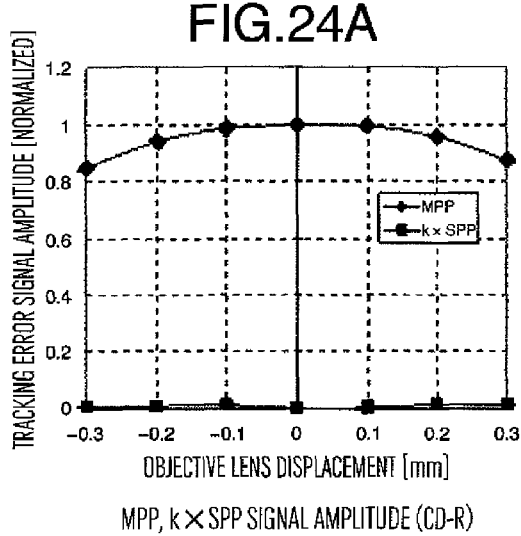
MPP, k × SPP SIGNAL AMPLITUDE (CD-R)
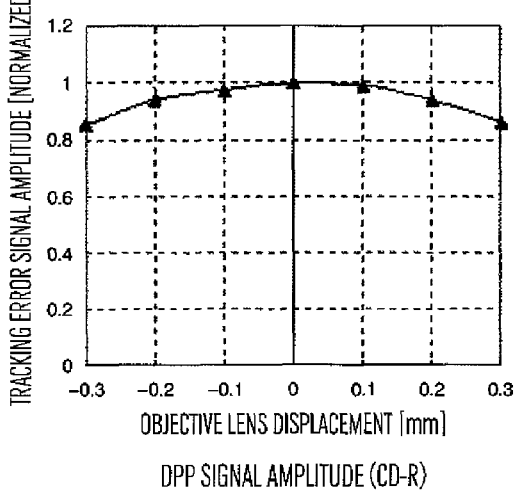
DPP SIGNAL AMPLITUDE (CD-R)
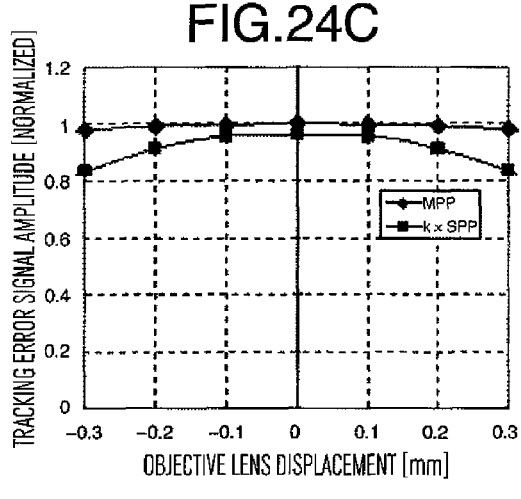
MPP, k × SPP SIGNAL AMPLITUDE (DVD-RW)
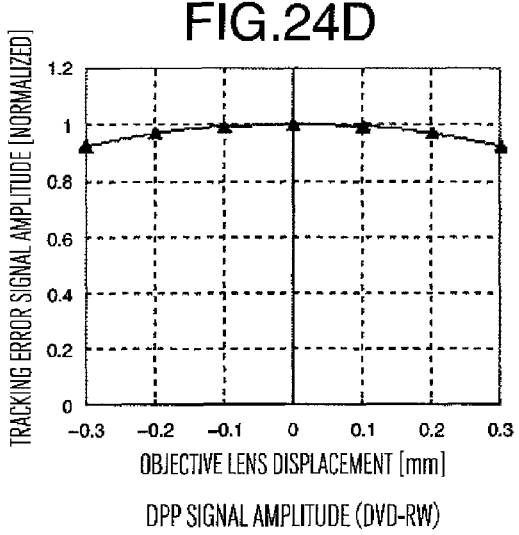
DPP SIGNAL AMPLITUDE (DVD-RW)
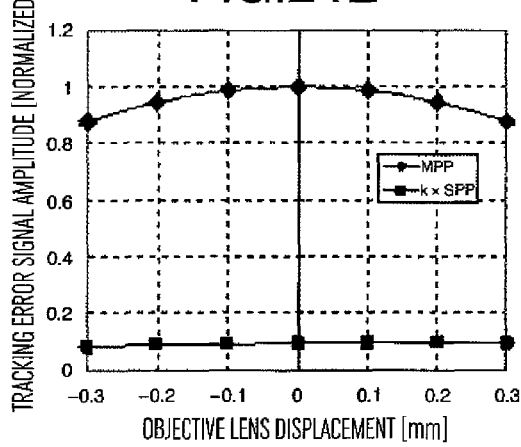
MPP, k × SPP SIGNAL AMPLITUDE (DVD-RAM II)
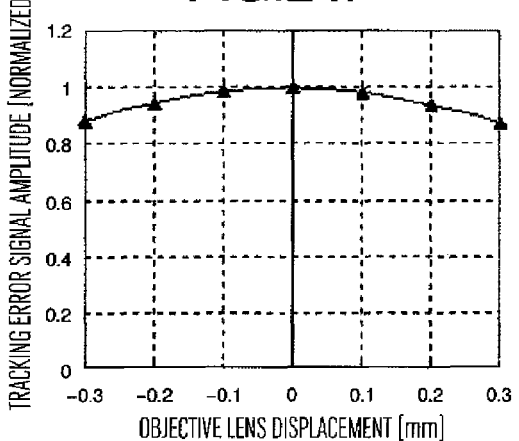
DPP SIGNAL AMPLITUDE (DVD-RAM II)

OPTICAL PICKUP DEVICE, OPTICAL DISC DEVICE, AND DIFFRACTION GRATING

INCORPORATION BY REFERENCE

The present application claims priority from Japanese application JP-2008-193012 filed on Jul. 28, 2008 the content of which is hereby incorporated by reference into this application.

BACKGROUND OF THE INVENTION

The present invention relates to an optical pickup device, an optical disc device, and a diffraction grating.

As a background art of this technical field is described in JP-A-9-81942. The document includes the description of the problem that "a tracking error signal detection device is provided that has a simple optical system and that suppresses an offset, generated by the translation of the objective lens and the tilt of an information recording medium, and at the same time keeps the maximized amplitude of the tracking error signal even if the track spacing of an information recording medium varies." The document also includes the description of the solution that "a light-condensing spot, formed by two light beams including one light beam half of which has a phase difference of 180 degrees, is formed on the information recording medium, the light beam from this information recording medium is received by a pair of two-part light detectors, and the tracking error signal of is obtained from the difference outputs".

SUMMARY OF THE INVENTION

In general, in order to correctly project a spot on a predetermined recording track on an optical disc, an optical pickup device detects the focus error signal to displace the objective lens into the focusing direction for making a focus direction adjustment and, in addition, detects the tracking error signal to displace the objective lens into the radial direction of an optical disc-shaped recording medium for making a tracking adjustment. The position of the objective lens is controlled by those signals. One of the tracking error signal detection methods that are known is the push-pull method, but the problem with this method is that a large DC fluctuation (hereinafter called a DC offset) tends to occur due to a displacement of the objective lens in the tracking direction. To avoid this problem, the differential push-pull method (hereinafter called conventional DPP method) that can reduce this DC offset is widely used.

The conventional DPP method can suppress an offset, which may be generated by the displacement of the objective lens or the tilt of an optical disc, by making the interval between each two of the three spots on an optical disc equal to the half of the track pitch in the optical disc radial direction. However, in the conventional DPP method described above, it is required that the interval between each two of the three spots on an optical disc be equal to the half of the track pitch in the optical disc radial direction for any type of optical disc. Therefore, the problem with this method is that the stable tracking error signal cannot be detected on an optical disc on which the track pitch varies.

To solve this problem, JP-A-9-81942 discloses a technology in which the phase difference between the periodic structure of one half of the diffraction grating and the periodic structure of the other half is set to 180 degrees to make it possible to detect the tracking error signal even when three spots on an optical disc are formed on the same track. The technology takes advantage of these characteristics to detect the tracking error signal even on an optical disc on which the track pitch varies. However, the use of the diffraction grating of such a periodic structure generates a problem on a recording-type optical disc. On a recording-type optical disc, there are two types of areas on a disc: recorded area (hereinafter called a recording part) and unrecorded area (unrecorded part). When a spot passes across the boundary between the recording part and the unrecorded part, an offset (hereinafter called a recorded-unrecorded boundary offset) is generated in the tracking error signal.

In the configuration disclosed in JP-A-9-81942, inability to suppress this recorded-unrecorded boundary offset makes it difficult to achieve stable tracking control. So, the problem to be solved is to suppress the recorded-unrecorded boundary offset.

In view of the foregoing, it is an object of the present invention to provide an optical pickup device and an optical recording and reproduction device that can suppress an offset in the tracking error signal generated in the boundary between an unrecorded area and a recorded area.

The object described above is achieved, for example, by the configuration described in the claims.

The present invention provides an optical pickup device and an optical information recording and reproduction device that can detect a stable tracking error signal.

BRIEF DESCRIPTION OF THE DRAWINGS

FIG. 3 is a diagram showing an optical detector in the first embodiment of the present invention.

FIG. 7 is a diagram showing the recorded/unrecorded boundary offset in the first embodiment.

FIG. 24A-24F are diagrams showing the objective lens displacement characteristics of the tracking error signal in the second embodiment of the present invention.

DETAILED DESCRIPTION OF THE EMBODIMENTS

Embodiments of the present invention will be described below.

First Embodiment

Figure 1:
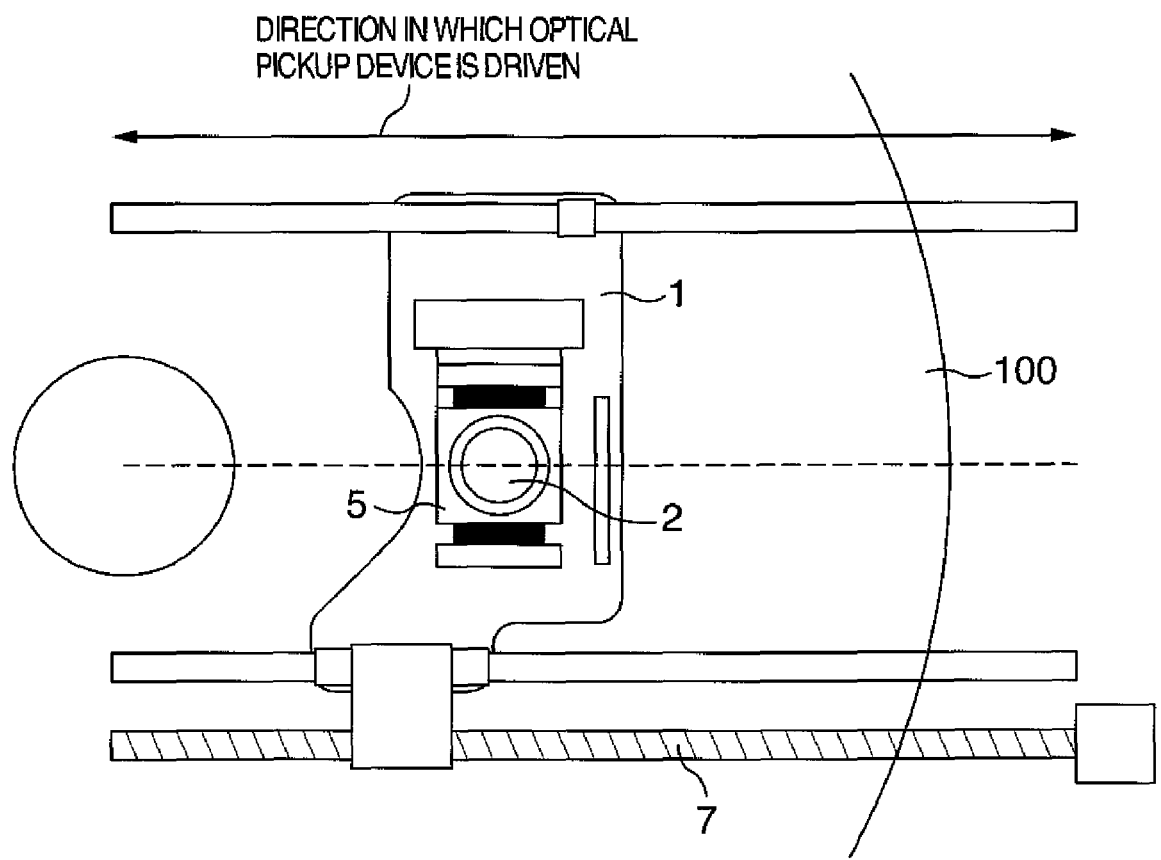
FIG. 1 is a diagram showing the layout of an optical pickup device and an optical disc in a first embodiment.

FIG. 1 is a general configuration diagram showing an example of an optical pickup device in a first embodiment of the present invention.

As shown in FIG. 1, an optical pickup device 1 is configured in such a way that it is driven into the radial direction of an optical disc 100 by means of a driving mechanism 7. The optical pickup device has an objective lens 2 installed on an actuator 5, and a light is projected from the objective lens 2 onto the optical disc 100.

Figure 2:
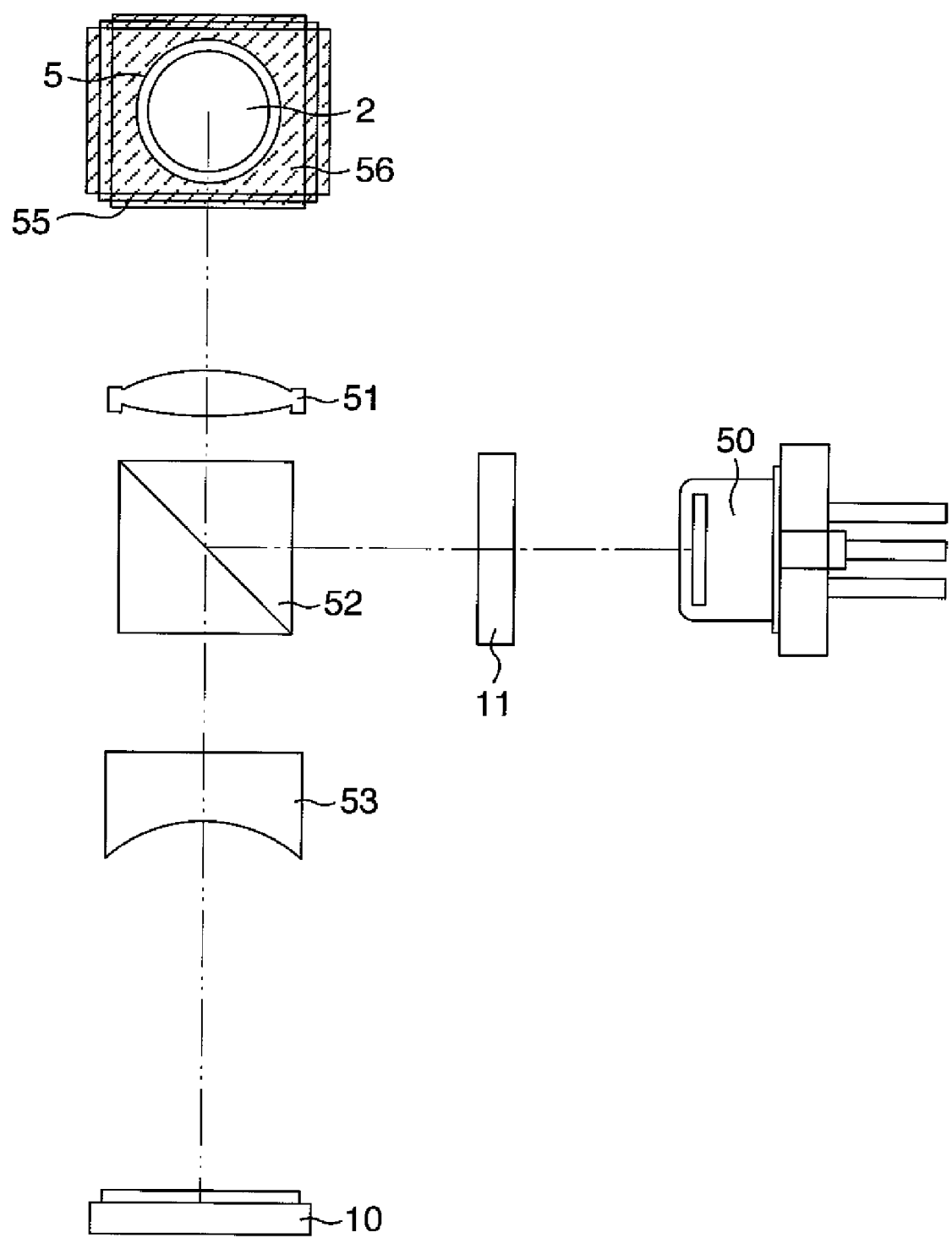
FIG. 2 is a diagram showing the configuration of an optical system in the conventional DPP method mentioned in the first embodiment.

First, the following describes the conventional DPP method briefly. FIG. 2 is a diagram showing an example of an optical system using the conventional DPP method.

From a semiconductor laser 50, a luminous flux of wavelength of about 660 nm is emitted as a diverging light. The luminous flux emitted from the semiconductor laser 50 is separated by a diffraction grating 11 into at least three luminous fluxes, that is, the luminous fluxes of zero-order and ± first-order lights. The luminous fluxes, separated into three, are reflected on a beam splitter 52 and are converted to almost parallel luminous fluxes by a collimator lens 51. The luminous fluxes transmitted through the collimator lens 51 are reflected on a mirror 55 and transmitted through a ¼ wavelength plate 56 and, after that, are condensed onto the optical disc 100 by means of the objective lens 2 installed on the actuator 5. At this time, three condensed spots are formed on the disc. The interval between each two of those three spots is adjusted by the diffraction grating so that the interval becomes equal to the half of the track pitch in the optical disc radial direction.

And, the luminous fluxes reflected on the optical disc 100 enters a light detector 10 through the objective lens 2, ¼ wavelength plate 56, mirror 55, collimator lens 51, beam splitter 52, and a detection lens 53.

The light detector 10 comprises three two-part or four-part light receiving surfaces 10a, 10b, and 10c, as shown in FIG. 3, and three beams reflected on the optical disc enter respective light receiving surfaces to form detection light spots 20a, 20b, and 20c. And, the tracking error signal (TES) is detected by carrying out the following calculation for the electrical signals output from the light receiving surfaces.

TES=$MPP-k \times (SPP1+SPP2)$ where the MPP signal, SPP1 signal, and SPP2 signals are push-pull signals detected on the light receiving surfaces 10a, 10b, and 10c. The description of the push-pull signal is omitted here because it is well known. k in the expression is the coefficient corresponding to the ratio between the light amount of the zero-order light and that of the ± first-order lights.

Because the phase of the MPP signal and the phase of the SPP1 signal and the SPP2 signal are reversed (SPP1 signal and SPP2 signal are in the same phase), the AC components of the push-pull signals are not cancelled in this calculation.

In contrast, if the objective lens is displaced or the optical disc is tilted, predetermined DC offset components are generated in the push-pull signals, and those offset components are generated apparently at the same polarity in MPP, SPP1, and SPP2 regardless of the spot positions on the disc surface. So, when the calculation described above is carried out, the only offset components included in the push-pull signals are selectively cancelled each other and, as a result, a good tracking error signal, from which only the offset components are completely removed or greatly reduced, can be detected.

As described above, the conventional DPP method is capable of detecting the stable tracking error signal even if the objective lens is displaced.

However, the conventional DPP method requires that the interval between each two of the three spots on the optical disc must be set equal to the half of the track pitch in the optical disc radial direction as described above. So, the problem is that, for an optical disc on which the track pitch varies, the stable tracking error signal cannot be detected.

Figure 4:
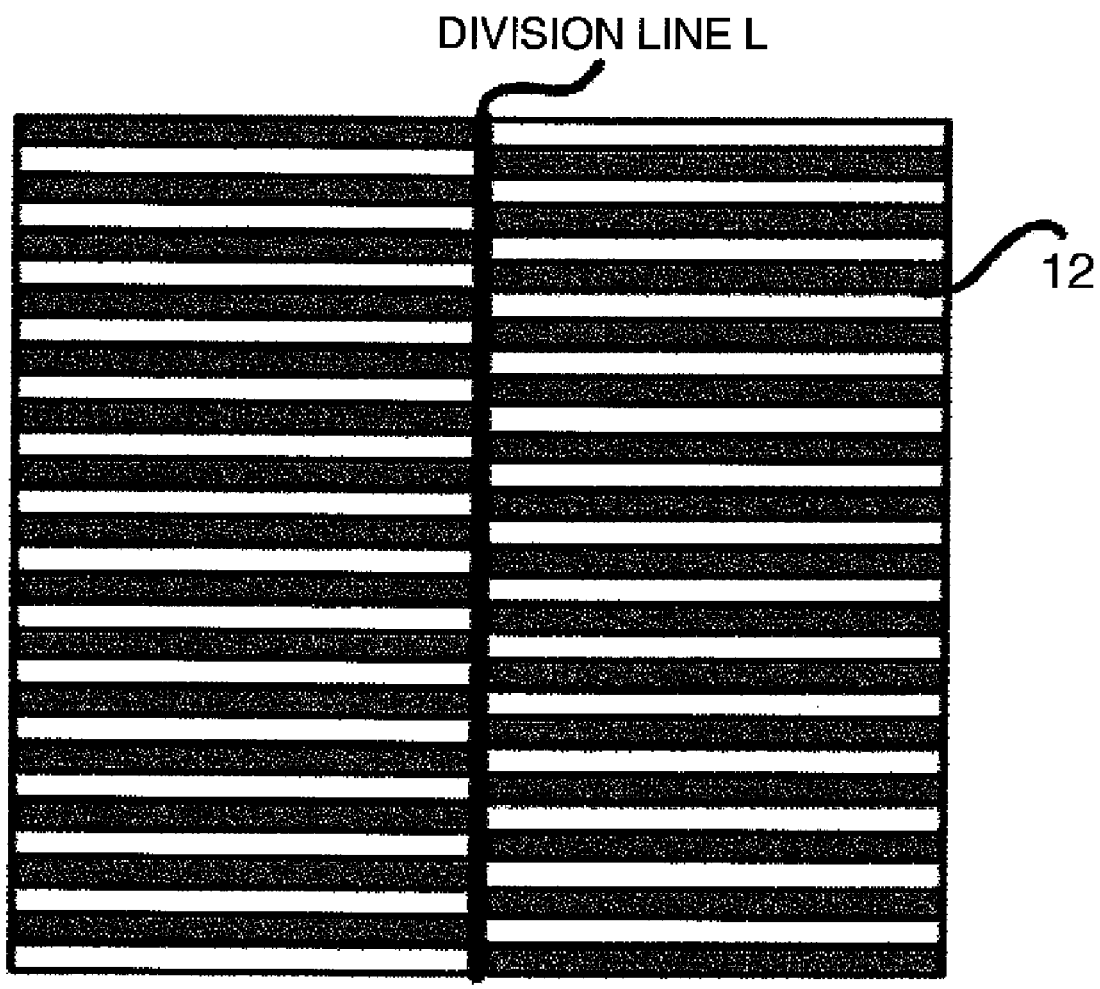
FIG. 4 is a diagram showing the diffraction grating of the conventional inline DPP method mentioned in the first embodiment.

To solve this problem, JP-A-9-81942 proposes a configuration in which a diffraction grating 12, shown in FIG. 4, is used to detect the sable tacking error signal on an optical disc on which the track pitch varies.

Figure 5:
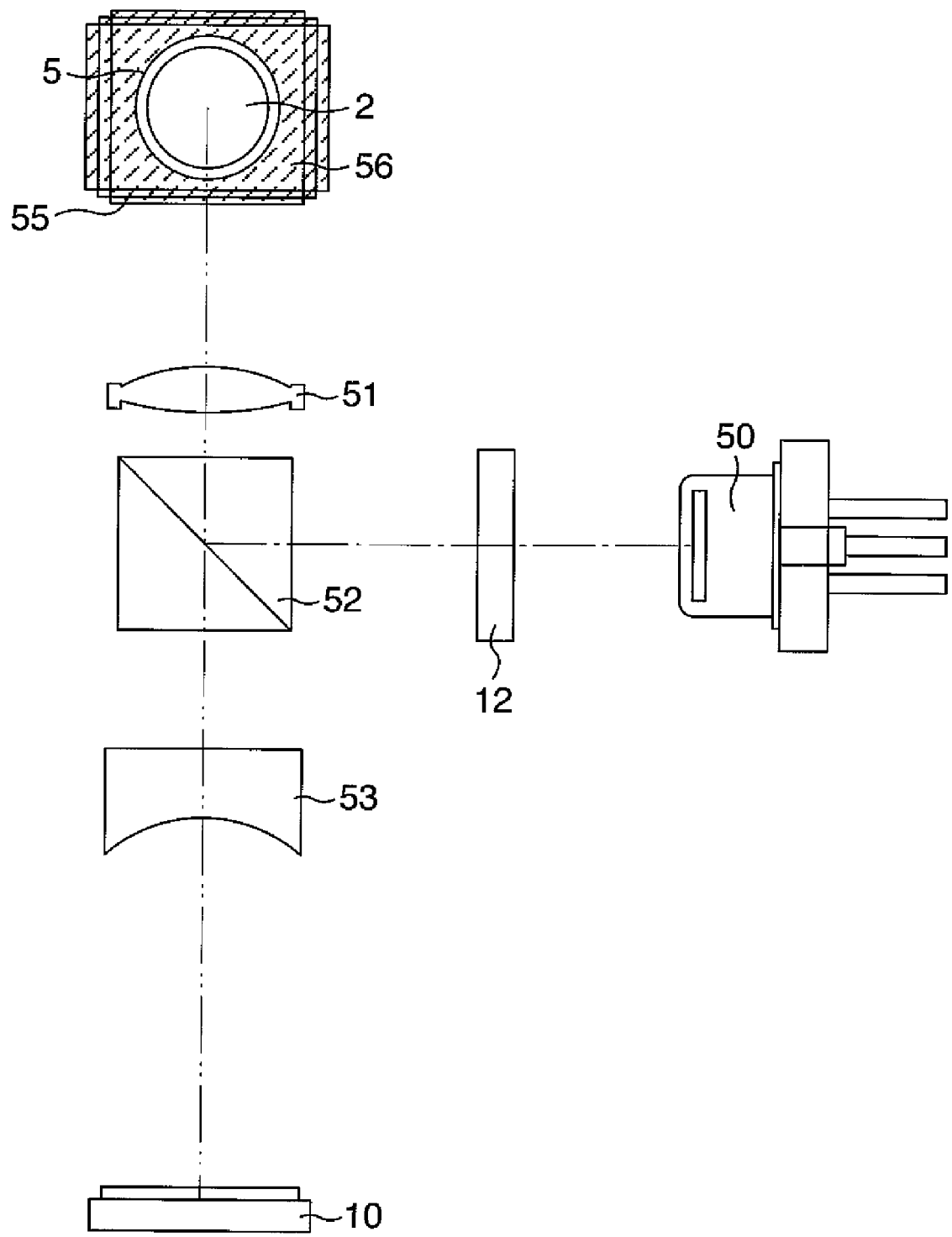
FIG. 5 is a diagram showing the configuration of an optical system in the first embodiment of the present invention.

The following briefly describes the tracking error signal detection method described in JP-A-9-81942 (hereinafter called conventional inline-type DPP method). FIG. 5 is a diagram showing an example of an optical system in which the conventional inline-type DPP method is used. This method is different from the conventional DPP method in that the diffraction grating 12 is used.

From a semiconductor laser 50, a luminous flux of wavelength of about 660 nm is emitted as a diverging light. The luminous flux emitted from the semiconductor laser 50 is separated by the diffraction grating 12 into at least three luminous fluxes, that is, the luminous fluxes of zero-order and ± first-order lights. The luminous fluxes, separated into three, are reflected on a beam splitter 52 and are converted to almost parallel luminous fluxes by a collimator lens 51. The luminous fluxes transmitted through the collimator lens 51 are reflected on a mirror 55 and transmitted through a ¼ wavelength plate 56 and, after that, are condensed onto the optical disc 100 by means of the objective lens 2 installed on the actuator 5. At this time, three condensed spots are formed on the disc. The three spots are adjusted by the diffraction grating so that they are arranged in the track direction on the disc.

And, the luminous fluxes reflected on the optical disc 100 enters a light detector 10 through the objective lens 2, ¼ wavelength plate 56, mirror 55, collimator lens 51, beam splitter 52, and a detection lens 53.

The light detector 10 comprises three two-part or four-part light receiving surfaces 10a, 10b, and 10c, for example, as shown in FIG. 3, and three beams reflected on the optical disc 100 enter respective light receiving surfaces to form detection light spots 20a, 20b, and 20c. And, the tracking error signal (TES) is detected by carrying out the following calculation for the electrical signals output from the light receiving surfaces.

$$TES = MPP - k \times (SPP1 + SPP2)$$

where the MPP signal, SPP1 signal, and SPP2 signals are push-pull signals detected on the light receiving surfaces 10a, 10b, and 10c. k in the expression is the coefficient corresponding to the ratio between the light amount of the zero-order light and that of the ± first-order lights.

Because the phase of the MPP signal and the phase of the SPP1 signal and the SPP2 signal are reversed (SPP1 signal and SPP2 signal are in the same phase), the AC components of the push-pull signals are not cancelled in this calculation.

The following describes the reason why the AC components of the MPP push-pull signal and those of the SPP1 and SPP2 push-pull signals are reversed (SPP1 signal and SPP2 signal are in the same phase) even when the three spots are arranged in the track direction on the optical disc (For details, see JP-A-9-81942).

Figure 6:
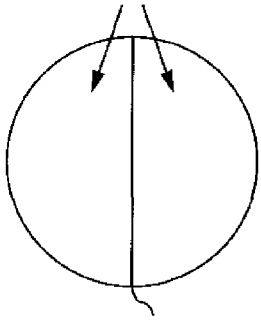
FIG. 6 is a diagram showing the phase relation among the push-pull signals in the conventional inline DPP method mentioned in the first embodiment.

FIG. 6 is a diagram showing the phase differences in the luminous flux of the zero-order light, the luminous flux of the + first-order light, and the luminous flux of the − first-order light after the light is diffracted by the diffraction grating and the phases of the luminous fluxes diffracted by the disc. The division line 1 in the figure corresponds to the division line L of the diffraction grating. Note that the figure does not show the phase relation between the zero-order light and the + first-order light, between the zero-order light and the − first-order light, and between the + first-order light and − first-order light after the diffraction by the diffraction grating. For simplicity, the phase difference in the luminous fluxes after the diffraction by the optical disc does not include the phase difference between the zero-order light and the ± first-order lights caused by the disc track.

FIG. 6 shows that the phase difference of the zero-order light, diffracted by the diffraction grating 12, with respect to the diffraction grating division line L is 0 degree. This means that the zero-order light has no phase difference with the respect to the division line L. (blank part and blank part across the luminous flux division line 1). In contrast, the ± first-order light has an about 180-degree phase difference with respect to the diffraction grating division line L (blank part and shaded part across the luminous flux division line 1).

The following briefly describes how the push-pull signal is detected. The push-pull signal refers to an interference signal of the zero-order light and the ± first-order light diffracted by a track on the optical disc. A predetermined phase difference between the zero-order light and the ± first-order light, caused according to the spot positions on a track, generates a contrast according to the track position, and this contrast is detected by the 2-part detector to generate the push-pull signal.

Next, the following describes how the push-pull signal is detected in the conventional inline DPP method. The zero-order light diffracted by the diffraction grating 12 is diffracted by a track on the disc, and the push-pull signal corresponding to the spot position is detected. The same signal as the MPP signal of the conventional DPP method is generated.

Similarly, the ± first-order lights diffracted by the diffraction grating 12 are diffracted by a track on the disc. However, because there is a phase difference of about 180 degrees with respect to the division line 1 as shown in FIG. 6, the light diffracted by the disc has the phase difference on a track on the disc and the phase difference of about 180 degrees. Therefore, the push-pull signal, which is an interference signal, is obtained as an interference signal (reversed phase signal) that is reversed with respect to the spot position. To summarize briefly, because the AC component of the push-pull signal is an interference signal, the phase of the MPP signal and the phase of the SPP1 signal and the SPP2 signal are reversed (SPP1 signal and SPP2 signal are in the same phase). In contrast, because a DC offset component generated by the displacement of the objective lens or by the tilt of the optical disc is not an interference signal, the MPP signal, SPP1 signal, and SPP2 signal are in the same phase. This makes it possible to detect the stable tracking error signal by carrying out the calculation described above. The advantage of this conventional inline DPP method is that the method is compatible with a disc with varying track pitches because the tracking error signal can be detected even when three spots are formed in the same track of the disc.

The important point here is that the conventional inline DPP method takes advantage of the fact that the AC component of the push-pull signal is an interference signal.

However, this conventional inline DPP method also have the serious problem of recorded/unrecorded boundary offsets. The following describes this problem.

FIG. 7 is a diagram showing the result of the MPP signal simulation in a recorded/unrecorded boundary. The calculation condition for the simulation is as follows.
Disc: DVD-RW
Wavelength: 660 nm
Objective lens NA: 0.61
Track pitch: 0.74 μm
Objective lens focal length: 3 mm
Spot scan position 0 μm or longer; Recorded part
Spot scan position −0.74 μm or shorter; Unrecorded part This figure indicates that the amplitude of the tracking error signal in the recorded part varies from the amplitude of the tracking error signal in the unrecorded part. This is a change in the amplitude of the tracking error signal caused when data is recorded. In addition to this change, an offset occurs at the moment the recorded/unrecorded boundary is crossed as indicated by the arrow in the figure. Because the tracking control is usually carried out under servo control at the zero-crossing point of the tracking error signal, this type of offset, if generated, not only simply causes a detrack condition in a track position on the disc but also sometimes prevents the tracking control from being carried out properly. This means that stable tracking control requires that an offset in the recorded/unrecorded boundary be suppressed.

Figure 8A:
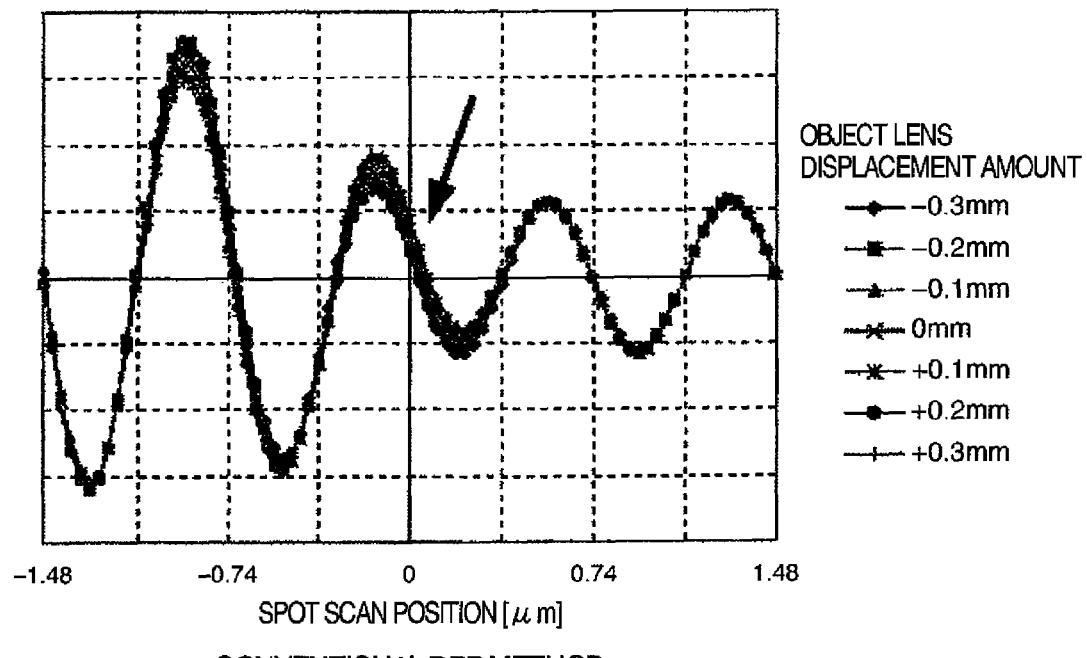
FIGS. 8A and 8B are diagrams showing the recorded/unrecorded boundary offset in the conventional inline DPP method mentioned in the first embodiment.
Figure 8B:
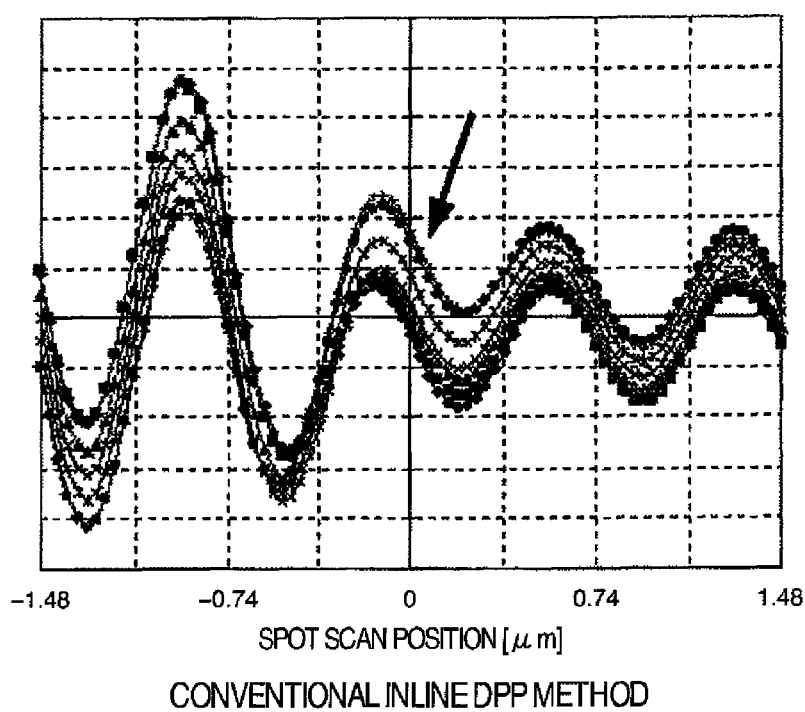

FIG. 8A and FIG. 8B show the simulation calculation results of the recorded/unrecorded boundary characteristics of the tracking error signal in the conventional DPP method and the conventional inline DPP method, respectively. The figures show the tracking error signals for the data corresponding to the displacement amounts of the objective lens in the range −0.3 mm to +0.3 mm which are used in the actual operation.

The figures indicate that conventional DPP method suppresses an offset in the recorded/unrecorded boundary but that the conventional inline DPP method does not. In addition, the offset in the recorded/unrecorded boundary in the conventional inline DPP method becomes larger as the objective lens is displaced. The problem is that the servo control cannot be carried out when a large recorded/unrecorded boundary offset, such as the one indicated by the arrow in the figure, occurs.

As described above, the problem to be solved in the conventional inline DPP method is the suppression of an offset in the recorded/unrecorded boundary. The following briefly describes the cause.

Figure 9:
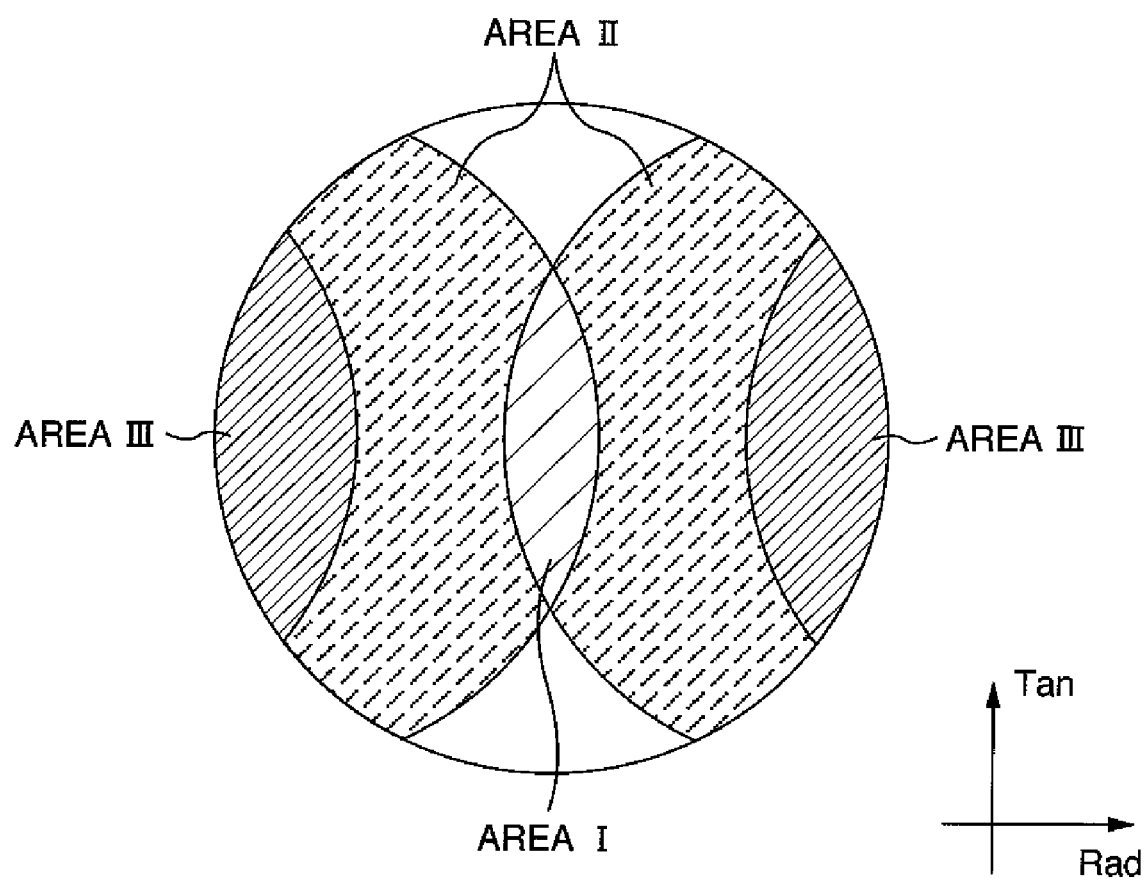
FIG. 9 is a diagram showing the areas in a luminous flux, where the recorded/unrecorded boundary offset is generated, in the first embodiment.

FIG. 9 is a diagram showing a luminous flux when a light reflected in the recorded/unrecorded boundary on the disc is transmitted through the object lens. Area III is an area where the push-pull signals are generated, and area II is an area where an offset in the recorded/unrecorded boundary is generated. Like the push-pull signal, this recorded/unrecorded boundary offset is an interference signal. The detail of the recorded/unrecorded boundary offset is omitted here because it is described in CPM2005-149, Institute of Electronics, Information and Communication Engineers (IEICE).

Figure 10:
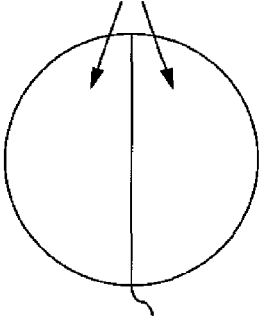
FIG. 10 is a diagram showing the recorded/unrecorded boundary offset in the conventional inline DPP method mentioned in the first embodiment.

The following describes a recorded/unrecorded boundary offset generated when the conventional inline DPP method is used. FIG. 10 is a diagram schematically showing only the interference area in which a recorded/unrecorded boundary offset is generated in the conventional inline DPP method. Although the offset is not actually generated only in an interference area where a recorded/unrecorded boundary offset is generated, it is assumed that the offset is generated only in the interference area for the sake of simplicity. In addition, the phase difference between the zero-order light and the ± first-order light that is generated in the recorded/unrecorded boundary on the optical disc is not considered for the sake of simplicity.

First, because the MPP signal shown in FIG. 10A is the same as that in the conventional DPP method, the same recorded/unrecorded boundary signal as that in FIG. 7 is detected. On the other hand, because the phase difference of the SPP1 signal and the SPP2 signal shown in FIGS. 10B and 10C is 180 degrees, the recorded/unrecorded boundary offset, which is an interference signal, and the MPP signal are reversed in phase. Therefore, the recorded/unrecorded boundary offset of the MPP signal and the recorded/unrecorded boundary offset of the SPP1 signal and the SPP2 signal are reversed in phase.

So, if the tracking error signal is detected from the above calculation, the recorded/unrecorded boundary offset cannot be suppressed.

As described above, in the conventional inline DPP method, the stable tracking error signal can be detected on an unrecorded disc, but not on a disc, such as a disc actually used, on which there is a recorded/unrecorded boundary. This is the problem with the conventional inline DPP method.

Figure 11:
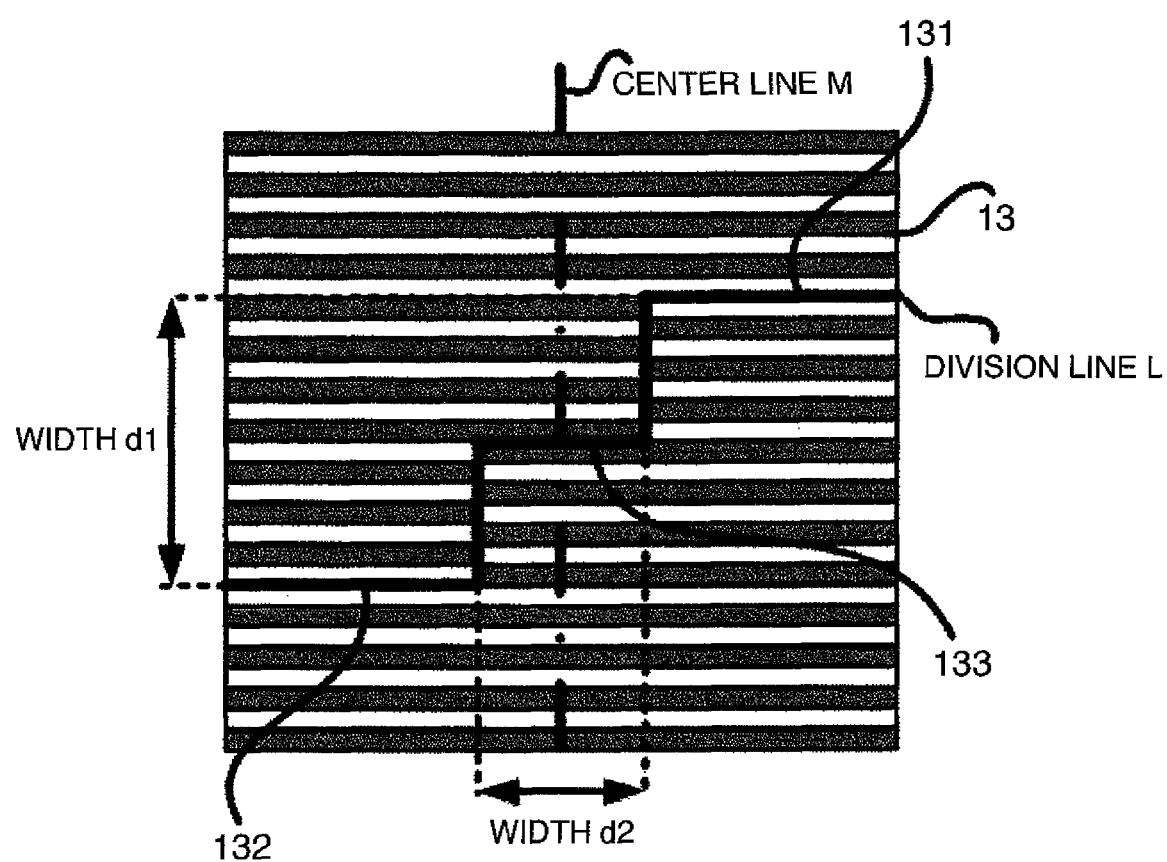
FIG. 11 is a diagram showing a diffraction grating in the first embodiment of the present invention.

To solve this problem, a new inline DPP method is proposed in this embodiment. The new inline DPP method is the same as the conventional inline DPP method in the optical system but is different in that a diffraction grating 13 shown in FIG. 11 is used. The diffraction grating 13 in this embodiment is divided into two areas. And, the division line that divides the diffraction grating 13 into two areas has a step in the direction almost vertical to the groove periodic structure, and the division line in the step has a staircase shape. The phase difference between one half of the groove periodic structure, divided by this division line, and the other half is approximately 180 degrees. So, there is no phase difference between the top area and the bottom area of the diffraction grating with respect to the center line M. The groove period of the diffraction grating is the same as that in the conventional inline DPP method.

Although, in the diffraction grating 13 shown in FIG. 11, a first division line 131 running from the right end of the diffraction grating 13 to the center line M and a second division line 132 running from the left end to the center line M are parallel to the grooves, those divisions lines may be inclined, starting at the end, at a predetermined angle with respect to the grooves. In addition, the diffraction grating 13 shown in FIG. 11 has a third division line 133 which connects between the first division line 131 and the second division line 132 and which passes through approximately the center of the diffraction grating 13. Although composed of a first straight line vertical to the grooves, a second straight line running approximately the center of the diffraction grating 13 and parallel to the grooves, and a third straight line vertical to the grooves, the third division line 133 is not limited to this configuration. The first straight line and the third straight line need not be vertical to the grooves, may be inclined to the grooves at a predetermined angle, or may be a curved line instead of a straight line.

Figure 12:
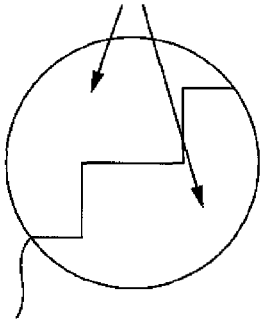
FIG. 12 is a diagram showing the phase relation among the push-pull signals in the first embodiment of the present invention.
Figure 13:
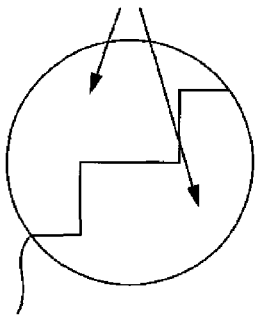
FIG. 13 is a diagram showing the recorded/unrecorded boundary offset in the first embodiment of the present invention.

FIG. 12 is a diagram showing an interference area where the push-pull signal is generated, and FIG. 13 is a diagram showing an interference area where a recorded/unrecorded boundary offset is generated. Although the offset is not actually generated only in an interference area where a recorded/unrecorded boundary offset is generated, it is assumed that the offset is generated only in the interference area for the sake of simplicity. In addition, the phase difference between the zero-order light and the ± first-order light, generated in the recorded/unrecorded boundary on the optical disc, is not considered for the sake of simplicity.

FIG. 12 indicates that, because the phase difference between the disc diffracted zero-order light and the disc diffracted ± first-order light is 180 degrees in the interference area (area III) where the sub-push-pull signal is detected, the MPP signal and the SPP1 signal and SPP2 signal are reversed in phase (SPP1 signal and SPP2 signal are in the same phase). So, as in the conventional inline DPP method, the stable tracking error signal can be obtained even if the three spots are formed in the same track.

In the interference area shown in FIG. 13 where a recorded/unrecorded boundary offset is generated, areas are generated where the phase difference is 180 degrees as in the conventional inline method but the phase difference is 0 degree in the areas (top and bottom of luminous flux) not related to the interference area of the push-pull signal. In addition, because the configuration of the diffraction grating has a staircase shape, areas are generated where the phase difference is 0 degree. So, this configuration makes it possible to suppress not only an offset in the recorded/unrecorded boundary of the SPP signal but also an offset in the recorded/unrecorded boundary of the MPP signal.

In the conventional inline DPP method, the recorded/unrecorded boundary offset is generated in the direction opposite to that of the MPP signal. In contrast, the diffraction grating of the present invention, when used, generates the recorded/unrecorded boundary offset in the same direction as that of the MPP signal, thus suppressing the recorded/unrecorded boundary offset of the DPP signal.

The present invention can suppress the recorded/unrecorded boundary offset, which has been the problem with the conventional inline DPP method, and thereby detect the stable tracking error signal even on a recording-type optical disc.

Figure 14:
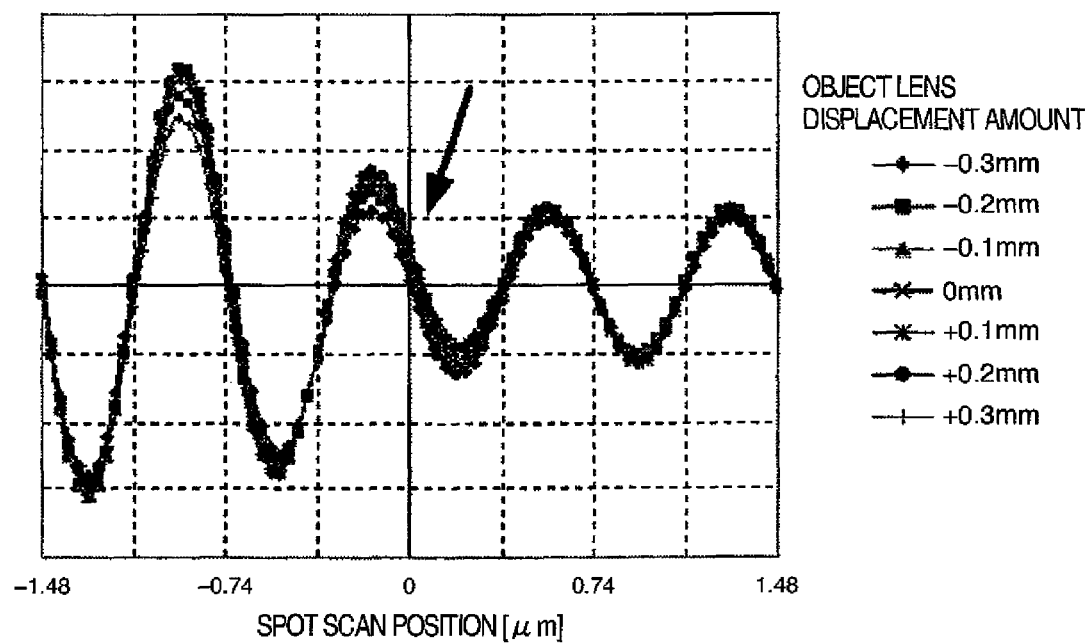
FIG. 14 is a diagram showing the recorded/unrecorded boundary offset in the first embodiment of the present invention.
Figures 15A, 15B, 15C:
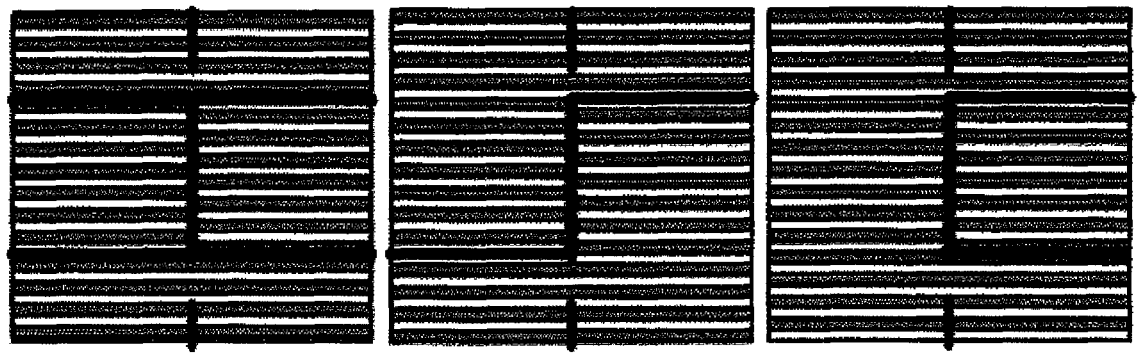
FIG. 15A-15C are diagrams showing another diffraction gratings in the first embodiment of the present invention.
Figure 16A:
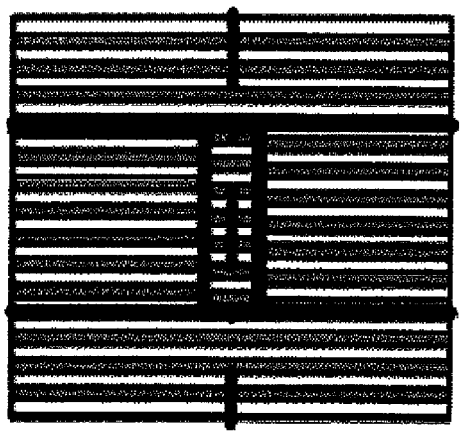
FIGS. 16A and 16B are diagrams showing another diffraction gratings in the first embodiment of the present invention.
Figure 16B:
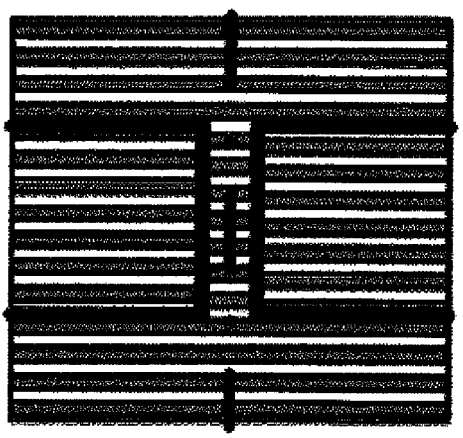
Figure 17A:
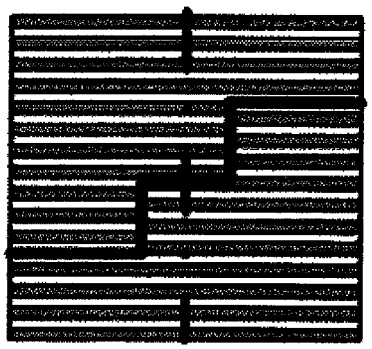
FIG. 17A-17C are diagrams showing another diffraction gratings in the first embodiment of the present invention.
Figure 17B:
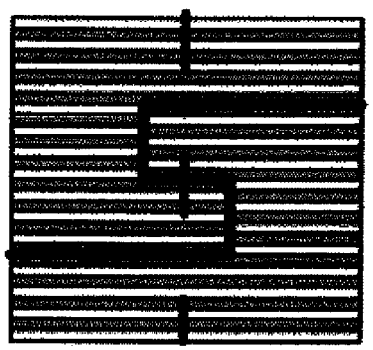
Figure 17C:
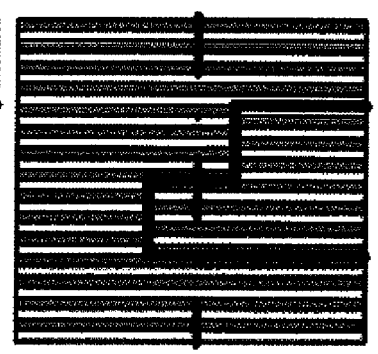
Figure 18A:
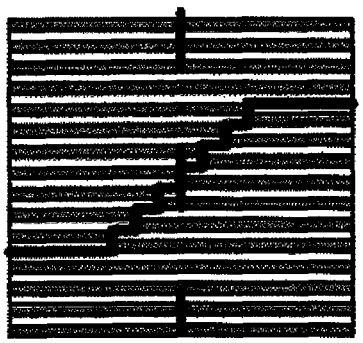
FIG. 18A-18C are diagrams showing another diffraction gratings in the first embodiment of the present invention.
Figure 18B:
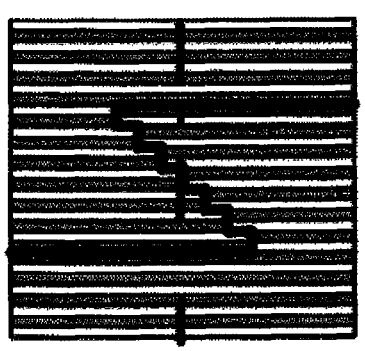
Figure 18C:
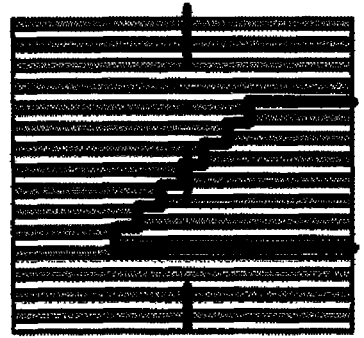
Figure 19A:
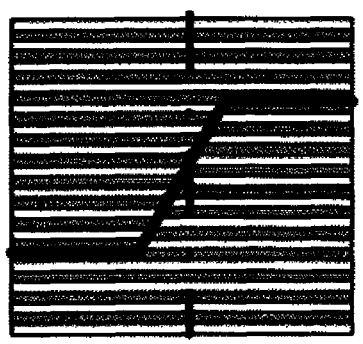
FIG. 19A-19C are diagrams showing another diffraction gratings in the first embodiment of the present invention.
Figure 19B:
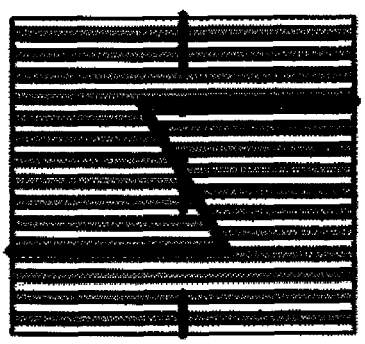
Figure 19C:
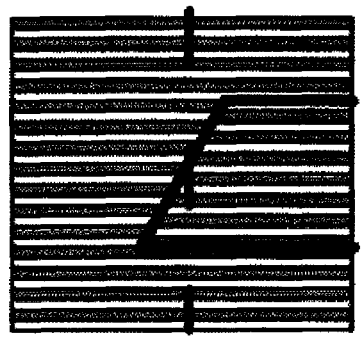

FIG. 14 is a diagram showing the result of the simulation calculation for the recorded/unrecorded boundary characteristics of the present invention. The calculation condition for the simulation is as follows.

Disc: DVD-RW
Wavelength: 660 nm
Objective lens NA: 0.61
Track pitch: 0.74 μm
Objective lens focal length: 3 mm
Spot scan position 0 μm or longer; Recorded part
Spot scan position −0.74 μm or shorter; Unrecorded part
Diffraction grating width d1: Effective luminous flux diameter ratio 60%
Diffraction grating width d2: Effective luminous flux diameter ratio 40%

The figure shows the tracking error signals for the data corresponding to the displacement amounts of the objective lens in the range −0.3 mm to +0.3 mm which are used in the actual operation. Comparison between this figure and FIG. 8B indicates that the recorded/unrecorded boundary offset, which is not suppressed in the conventional inline DPP method, is suppressed.

As described above, though the inline DPP method is used, the offset in the recorded/unrecorded boundary can be suppressed by using the structure in which there is no phase difference in the top area and the bottom area of the diffraction grating with respect to the center line M. In addition, the recorded/unrecorded boundary offset can be further suppressed by using a staircase configuration in the area where a phase difference is generated.

The effect of suppressing an offset generated in the recorded/unrecorded boundary has been described using the diffraction grating 13 with the structure, shown in FIG. 11, as the diffraction grating, it is apparent that an offset generated in the recorded/unrecorded boundary can be suppressed also by using any of the diffraction grating structures, such as those shown in FIG. 15A to FIG. 20B, as the diffraction grating. More specifically, when any of the diffraction gratings shown in FIGS. 15A, 15B, 15C, 16A and 16B is divided into three areas in the top-to-bottom direction, that is, in the direction vertical to the groove direction, the structure of the grooves in the top area above, and bottom area below, the intermediate part is a structure where there is no phase difference with respect to the center line M. Because of this structure, the recorded/unrecorded boundary offset, which cannot be suppressed in the conventional inline DPP method, can be suppressed.

Note that the diffraction gratings shown in FIGS. 15A, 15B, 15C, 16A and 16B are exemplary only. The diffraction grating can be divided in any way. It is only required that, when the diffraction grating is divided into three areas in the top-to-bottom direction, that is, in the direction vertical to the groove direction, the intermediate area includes at least two areas in both sides of the center line M and that those two areas have the same groove period with a phase difference of about 180 degrees between the groove period structures. In addition, there may or may not be a phase difference between the top area and the bottom area, which are above and below the intermediate area, as long as there is no phase difference in each of those areas with respect to the center line M. The phase difference between the top area and the bottom area may be the same as, or different from, the phase difference of the groove period of the intermediate part. That is, the phase difference between the top area and the bottom area may be 45 degrees or 90 degrees different from the phase difference of the groove period of the intermediate part.

The division line in the intermediate part between the top area and the bottom area of the diffraction grating may have any shape. The division line may have the shape of the uppercase letter H turned sideways such as the one shown in FIG. 15A and FIGS. 16A and 16B or the shape of the letter C such as the one shown in FIG. 15C.

Figure 20A:
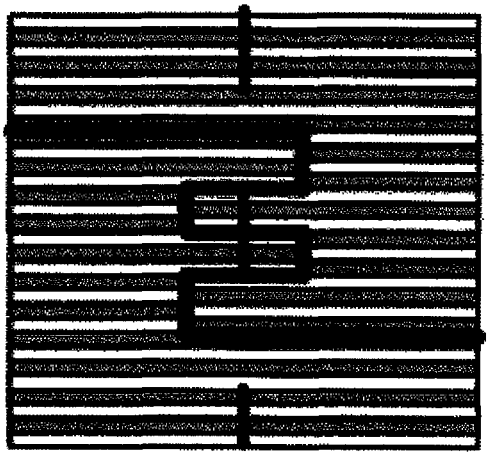
FIGS. 20A and 20B are diagrams showing another diffraction gratings in the first embodiment of the present invention.
Figure 20B:
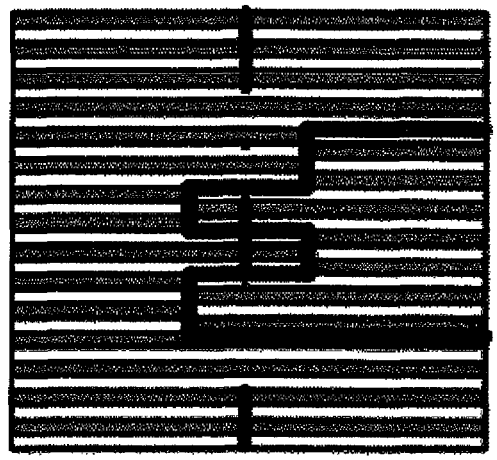

Also for the diffraction gratings shown in FIG. 17A to FIG. 20B, the offset in the recorded/unrecorded boundary can be suppressed by setting up the structure of the top area and the bottom area of each diffraction grating in such a way that they have no phase difference with respect to the center line M. In addition, the offset in the recorded/unrecorded boundary can be further suppressed by setting up the division line in the area, where there is a phase difference, in such a way that the division line has a staircase shape (FIGS. 17A-17C, FIGS. 18A-18C), a slope shape (FIGS. 19A-19C), or a shape of multiple staircases arranged almost vertically to the periodic structure of the diffraction grating (FIGS. 20A and 20B). The division line in the intermediate part between the top area and the bottom area of the diffraction grating may have any shape, that is, it may have a multiple-step shape such as the one shown in FIG. 17A, a shape of the letter S such as the one shown in FIG. 17B, or a shape of the letter Z.

Although the application to a DVD has been described in this embodiment, the optical pickup may be applied also to other recording modes such as that for a CD or a BD. Furthermore, the same effect can of course be achieved also by applying this method to a CD/DVD compatible optical pickup device or a CD/DVD/BD compatible optical pickup device.

Second Embodiment

Figure 21:
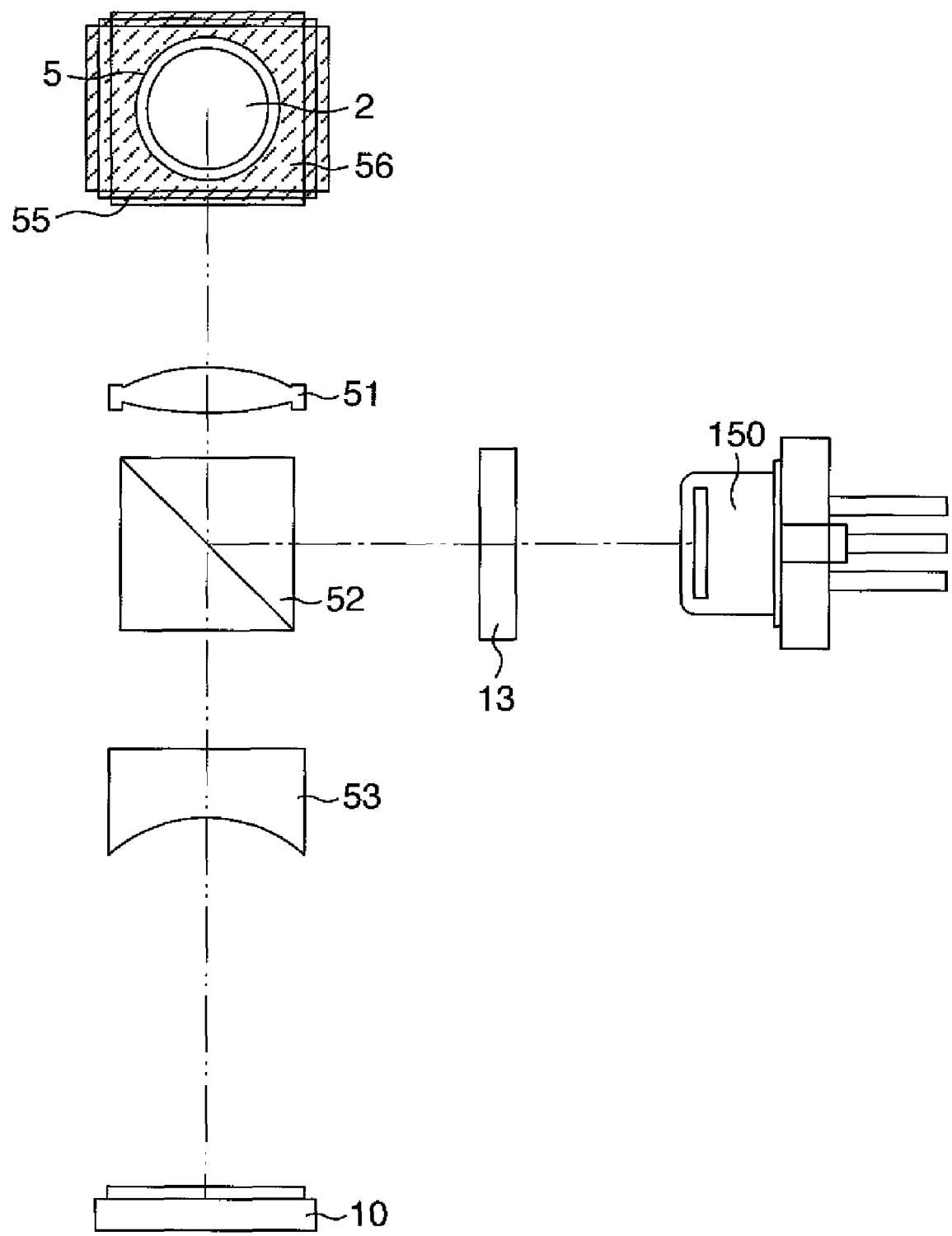
FIG. 21 is a diagram showing the configuration of an optical system in a second embodiment of the present invention.

FIG. 21 is a diagram showing an example of an optical system in a second embodiment of the present invention.

From a semiconductor laser 150 (hereinafter called a twin wave laser), a luminous flux of wavelength of about 660 nm and a luminous flux of wavelength of about 780 nm are emitted as a diverging light. The luminous flux emitted from the twin wave laser 150 is separated by a diffraction grating 13 into at least three luminous fluxes, that is, the luminous fluxes of zero-order and ± first-order lights. The luminous fluxes, separated into three, are reflected on a beam splitter 52 and are converted to almost parallel luminous fluxes by a collimator lens 51. The luminous fluxes transmitted through the collimator lens 51 are reflected on a mirror 55 and transmitted through a ¼ wavelength plate 56 and, after that, are condensed onto an optical disc 100 by means of an objective lens 2 installed on an actuator 5. At this time, three condensed spots are formed on the disc. The three spots are adjusted by the diffraction grating so that they are arranged in the track direction.

And, the luminous fluxes reflected on the optical disc 100 enters a light detector 10 through the objective lens 2, ¼ wavelength plate 56, mirror 55, collimator lens 51, beam splitter 52, and a detection lens 53.

Figure 22:
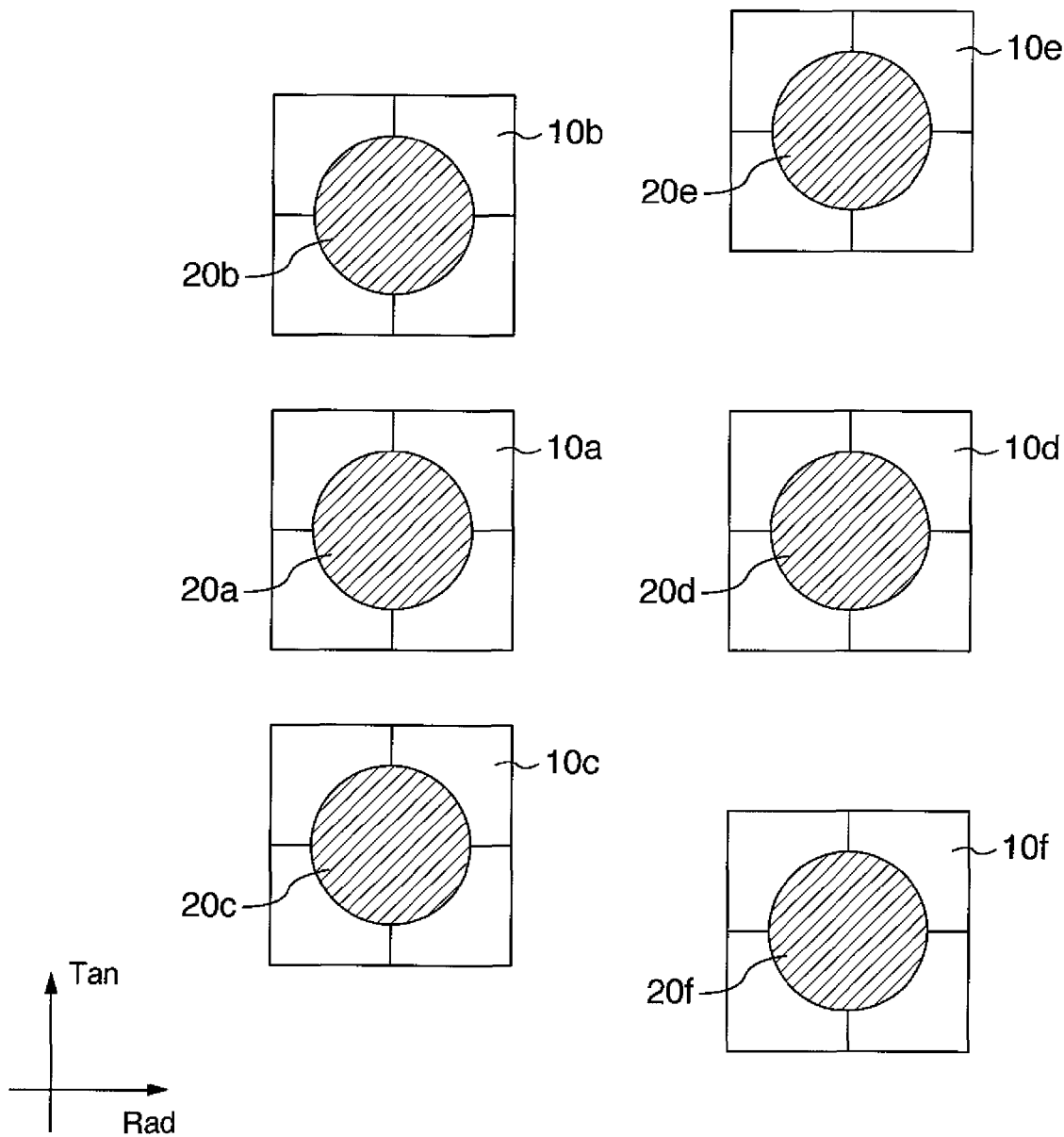
FIG. 22 is a diagram showing an optical detector in the second embodiment of the present invention.

The light detector 10 comprises three two-part or four-part light receiving surfaces 10a, 10b, and 10c for a DVD, and three two-part or four-part light receiving surfaces 10d, 10e, and 10f for a CD, as shown in FIG. 22, and three beams reflected on the optical disc enter respective light receiving surfaces to form detection light spots. Detection light spots 20a, 20b, and 20c are formed on a DVD, and detection light spots 20d, 20e, and 20f are formed on a CD. And, the tracking error signal (TES) is detected by carrying out the following calculation for the electrical signals output from the light receiving surfaces.

$$TES=MPP-k\times(SPP1+SPP2)$$

where the MPP signal, SPP1 signal, and SPP2 signals are push-pull signals detected on the light receiving surfaces 10a, 10b, and 10c or 10d, 10e, and 10f. k is the coefficient corresponding to the ratio between the light amount of the zero-order light and that of the ± first-order lights.

Conventionally, when the twin wave laser is used, a special diffraction grating must be installed as described in JP-A-2002-350625. This is because, in the conventional DPP method, the interval between each two of the three spots on a CD or DVD optical disc cannot be set equal to the half of the track pitch in the optical disc radial direction using one diffraction grating. So, the problem is that the stable tracking error signal cannot be detected on all recording-type CD and DVD optical discs.

To solve this problem, a diffraction grating having such wavelength selectivity has been conventionally installed to ensure compatibility between a CD and a DVD. However, the need to install such a special diffraction grating for ensuring compatibility between a CD and a DVD leads to an increase in the cost of an ordinary diffraction grating.

In addition, the conventional inline DPP method described in JP-A-9-81942, in which three beams are arranged in the track direction on an optical disc track, has the following problem.

Because the light emitting point of the twin wave laser differs between a DVD and a CD, matching the DVD optical system, shown in FIG. 4, with the division line L of the diffraction grating results in the CD optical system not matching with the division line L. The CD optical system that does not match with the division line causes much light to transmit through one of the areas of the diffraction grating with respect to the division line L, and the problem is that the tracking error control cannot be carried out stably.

Figure 23A:
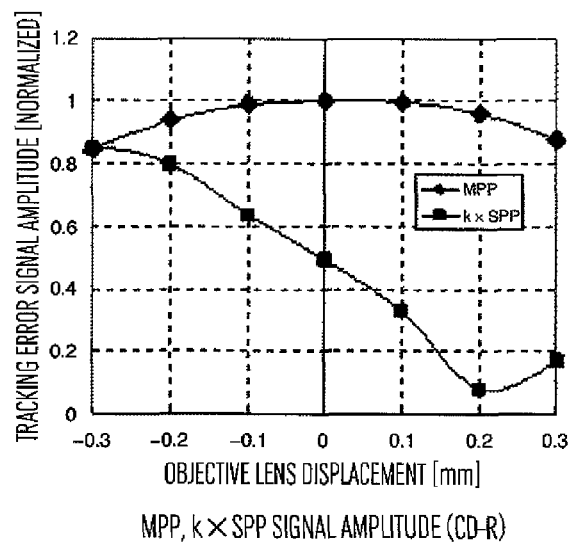
FIGS. 23A and 23B are diagrams showing the objective lens displacement characteristics of the tracking error signal in the conventional inline DPP method mentioned in the second embodiment.
Figure 23B:
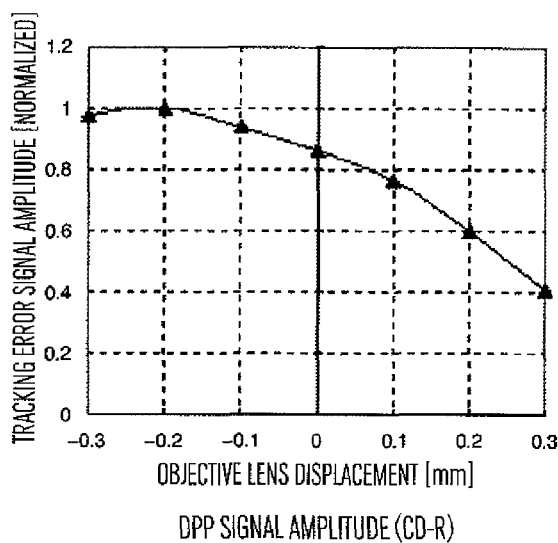

FIGS. 23A and 23B are diagrams showing the objective lens displacement characteristics of the MPP signal, k×SPP signal (SPP signal is the sum of SPP1 signal and SPP2 signal), and DPP signal, which are tracking error signals generated on a CD-R in the conventional inline DPP method, when the twin wave laser is used. The objective lens shift characteristics in FIGS. 23A, 23B are normalized with respect to the peak value of the MPP signal, and the objective lens shift characteristics in FIG. 23B are normalized with respect to the peak value of the DPP signal. The calculation condition for the simulation is as follows.

Disc: CD-R
Wavelength: 780 nm
Objective lens NA: 0.47
Track pitch: 1.6 µm
Objective lens focal length: 3 mm
Intensity distribution deviation on objective lens: −7.3 µm
Diffraction grating division line deviation on objective lens: 0.5 mm The figures show that the objective lens position, which should correspond to the amplitude peak of the DPP signal that is the tracking error signal of a CD, deviates from the center position. From the viewpoint of servo signal detection, it is desirable that the objective lens be in the center position.

This deviation is caused because the objective lens position, which should correspond to the peak of the signal amplitude of the SPP signal, is largely deviated from the center position, which is, in turn, caused by the fact that the CD optical system is deviated from the division line L (center line) of the diffraction grating 12. A large shift in the tracking error amplitude in the objective lens displacement direction, if present, prevents the tracking control from being carried out properly.

Because of the two reasons given above, the optical pickup device that uses the conventional twin wave laser has no configuration in which cost requirements and performance requirements are satisfied.

To solve this problem, the diffraction grating shown in FIG. 11 is used in this embodiment to ensure compatibility between a DVD and a CD. The diffraction grating 13 in the present invention is divided into two areas. And, the division line that divides the diffraction grating 13 into two areas has a step in the direction almost vertical to the groove periodic structure, and the division line in the step has a staircase shape. The phase difference between one half of the groove periodic structure, divided by this division line, and the other half is approximately 180 degrees. So, there is no phase difference between the top area and the bottom area of the diffraction grating with respect to the center line M. The groove period of the diffraction grating is equal between the top area and the bottom area.

FIGS. 24A-24F are diagrams showing the objective lens displacement characteristics of the MPP signal, SPP signal, and DPP signal that are tracking error signals of a CD-R, a DVD-RW, and a DVD-RAM when the diffraction grating of the present invention is used.

Disc: CD-R
Wavelength: 780 nm
Objective lens NA: 0.47
Track pitch: 1.6 µm
Objective lens focal length: 3 mm
Intensity distribution deviation on objective lens: −7.3 µm
Diffraction grating division line deviation on objective lens: 0.5 mm
Disc: DVD-RW
Wavelength: 660 nm
Objective lens NA: 0.61
Track pitch: 0.74 µm
Objective lens focal length: 3 mm
Intensity distribution deviation on objective lens: 0 µm (center of DVD)
Diffraction grating division line deviation on objective lens: 0 mm (center of DVD)
Disc: DVD-RAM II
Wavelength: 660 nm
Objective lens NA: 0.61
Track pitch: 1.23 µm
Objective lens focal length: 3 mm
Intensity distribution deviation on objective lens: 0 µm (center of DVD)
Diffraction grating division line deviation on objective lens: 0 mm (center of DVD)
Diffraction grating width d1: DVD effective luminous flux ratio 60%
Diffraction grating width d2: DVD effective luminous flux ratio 40%

The objective lens shift characteristics in FIGS. 24A, 24C and 24E are normalized with respect to the peak value of the MPP signal, and the objective lens shift characteristics in FIGS. 24B, 24D and 24F are normalized with respect to the peak value of the DPP signal.

The figures show that the SPP signal amplitude is generated on a DVD-RW but almost no SPP signal amplitude on a DVD-RAM II. This is due to the difference in the track pitch between a DVD-RW and a DVD-RAM II. As the track pitch is increased for the object lens NA, the area III shown in FIG. 9 becomes larger. For a DVD-RW(also for a DVD-R), there is the area III only in the areas where there is a phase difference of 180 degrees in the diffraction grating; for a DVD-RAM II, there is the area III also in areas where there is no phase difference and so they are cancelled each other. Because the diffraction grating has a staircase configuration, the area where the phase difference is 0 becomes large. So, almost no AC component of the SPP signal is generated. Nor is the AC component generated on a CD-R.

In the conventional inline DPP method, the objective lens position, which corresponds to the peak of the signal amplitude of the SPP signal of a CD-R, is deviated largely from the center position. In contrast, in the present invention, the amplitude of the SPP signal of a CD is reduced to minimize the effect.

In detecting the servo signal, there is no problem even if the AC component of the SPP signal of a DVD-RAM II or a CD-R is small. In this case, too, the recorded/unrecorded boundary offset, which is the problem with a DVD-RW, can be suppressed as evidenced in the first embodiment.

As described above, the diffraction grating 13 of the present invention, if installed, allows a CD and a DVD to be used compatibly without increasing the cost.

Although the diffraction grating shown in FIG. 11 is used in the description of this embodiment, the same effect can of course be achieved also by any of the diffraction grating structures such as those shown in FIG. 17A to FIG. 20B.

Although the CD/DVD compatible optical pickup device has been described in this embodiment, the same effect can of course be achieved also by applying the method of this embodiment to a CD/DVD/BD compatible optical pickup device.

Third Embodiment

In a third embodiment, an optical reproduction device on which an optical pickup device 1 is installed will be described.

Figure 25:
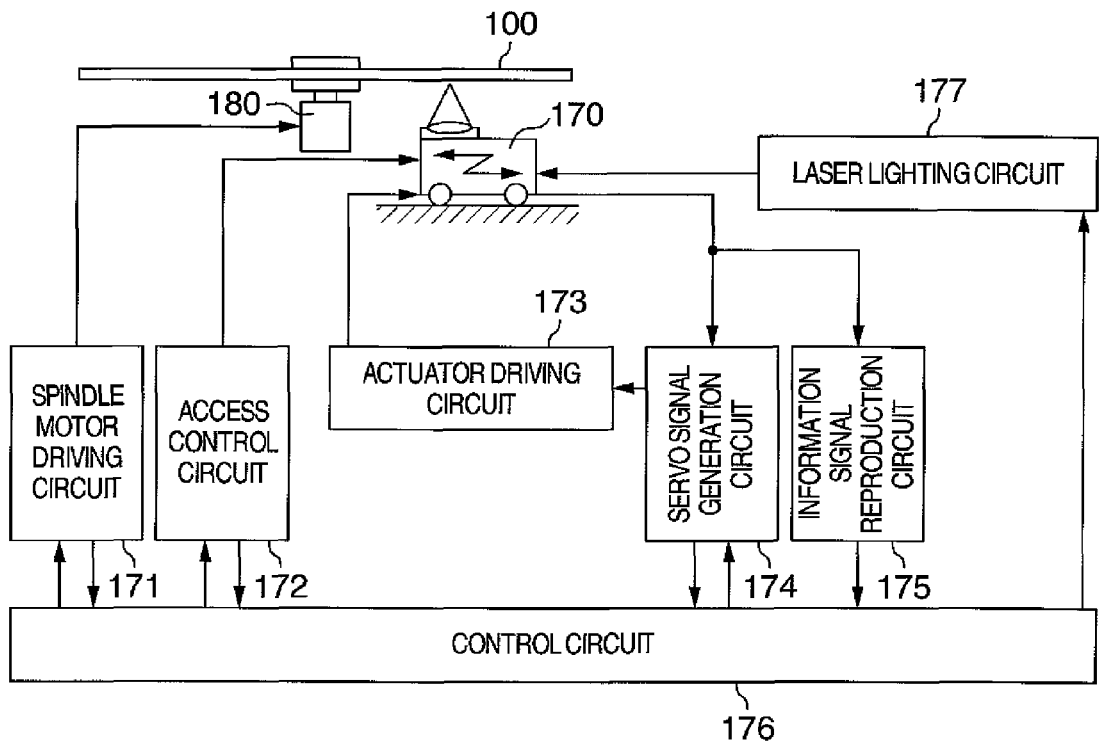
FIG. 25 is a diagram showing an optical reproduction device in a third embodiment.

FIG. 25 is a diagram showing the general configuration of the optical reproduction device. The optical pickup device 1, which has a mechanism that moves itself along the radial direction of the optical disc 100, has its position controlled according to the access control signal from an access control circuit 172.

A predetermined laser driving current is supplied from a laser lighting circuit 177 to a semiconductor laser in the optical pickup device 1, and a predetermined light amount of laser light is emitted from the semiconductor laser according to the reproduction. The laser lighting circuit 177 may also be built in the optical pickup device 1.

The signal output from the optical detector in the optical pickup device 1 is sent to a servo signal generation circuit 174 and an information signal reproduction circuit 175. The servo signal generation circuit 174 generates the servo signals, such as the focus error signal, tracking error signal, and tilt control signal, based on the signal from the optical detector and drives the actuator in the optical pickup device 1 via an actuator driving circuit 173 based on the generated servo signals to control the position of the objective lens.

The information signal reproduction circuit 175 reproduces the information signal, recorded on the optical disc 100, based on the signal from the optical detector.

A part of the signals obtained by the servo signal generation circuit 174 and the information signal reproduction circuit 175 are sent to a control circuit 176. This control circuit 176, to which a spindle motor driving circuit 171, an access control circuit 172, the servo signal generation circuit 174, and the laser lighting circuit 177 are connected, controls the rotation of a spindle motor 180 that rotates the optical disc 100, controls the access direction and the access position, controls the servo operation of the objective lens, and controls the light amount of semiconductor laser in the optical pickup device 1.

Fourth Embodiment

Figure 26:
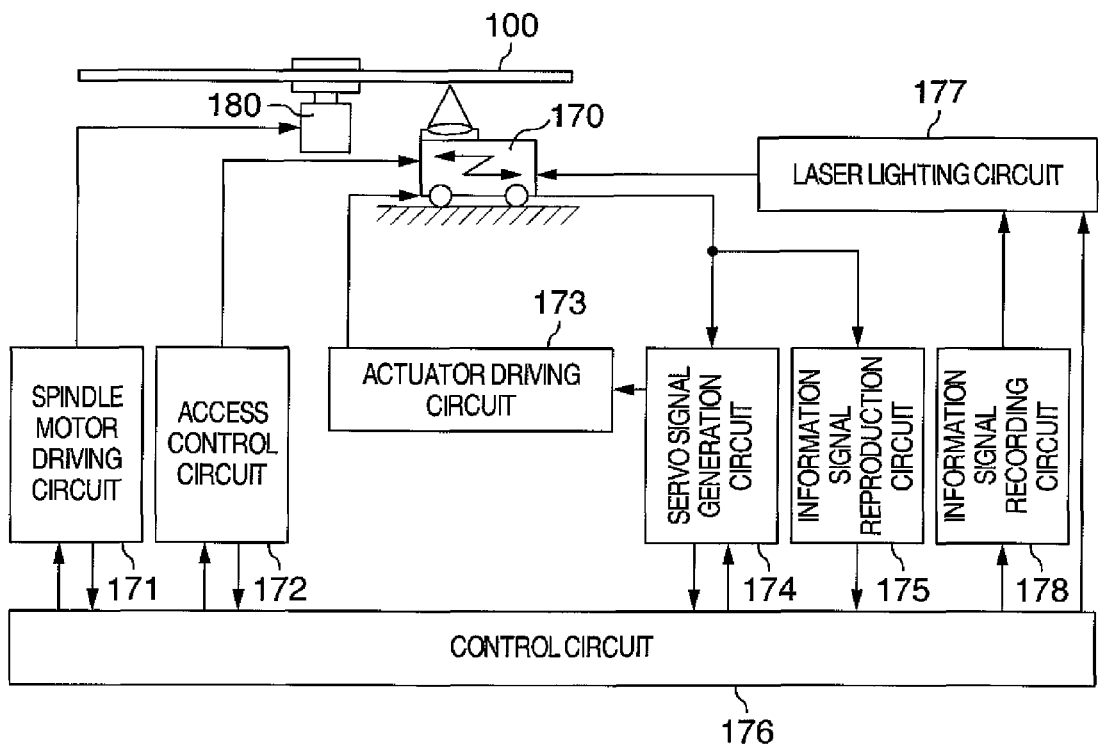
FIG. 26 is a diagram showing an optical recording/reproduction device in a fourth embodiment.

In a fourth embodiment, an optical recording/reproduction device on which an optical pickup device 1 is installed will be described. FIG. 26 is a diagram showing the general configuration of the optical recording/reproduction device. This device is different from the optical information recording/reproduction device shown in FIGS. 19A-19C in that an information signal recording circuit 178 is provided between a control circuit 176 and a laser lighting circuit 177 to provide the function to control the lighting of the laser lighting circuit 177, based on the recording control signal from the information signal recording circuit 178, for writing desired information on the optical disc 100.

Although the embodiments of the optical pickup according to the present invention and the optical recording/reproduction device having the optical pickup have been described, it is to be understood that the invention is not limited to those embodiments, and that various other improvements and modifications may be added without departing from the scope or spirit of the invention.

The invention claimed is:

1. An optical pickup device comprising:
a semiconductor laser that emits a laser beam;
a diffraction grating that diverges a luminous flux emitted from said semiconductor laser;
an objective lens that irradiates the luminous flux, emitted from said semiconductor laser, onto an optical disc; and
an optical detector that receives the luminous flux reflected by the optical disc wherein
said diffraction grating has a first area and a second area that have the same groove period and that have a phase difference of 180 degrees in groove period structures,
a division line that separates the first area and the second area is a division line running through a center of said diffraction grating and continuing from one end of said diffraction grating to another end or from one position on one end of said diffraction grating to another position on the end,
wherein, when a virtual line running through a center of said diffraction grating orthogonally to the grooves is assumed to be a center line,
the division line that separates the first area and the second area comprises
a first division line extending from one end of said diffraction grating to the center line,
a second division line running from another end, which is opposite to the one end, to the center line, and
a third division line running through the center and connecting the first division line and the second division line and
in a direction orthogonal to the grooves, a position on the one end of said first division line is different from a position on the another end of said second division line.

2. The optical pickup device according to claim 1 wherein
the first division line and the second division line are parallel to the grooves and
the third division line runs through approximately a center of said diffraction grating and intersects the grooves orthogonally or at a predetermined angle.

3. The optical pickup device according to claim 2 wherein
the first division line and the second division line are parallel to the grooves and
the third division line comprises at least a first straight line connected to the first division line and parallel to the grooves, a second straight line connected to the first straight line and running through the center of said diffraction grating orthogonally to the grooves, and a third straight line connected to the second straight line and parallel to the grooves.

\* \* \* \* \*